April 17, 1962 J. M. N. HANLET 3,030,515

ELECTRONIC BISTABLE DEVICE

Filed Jan. 2, 1959

Inventor
Jacques M. N. Hanlet
By Ralph B. Stewart
attorney.

United States Patent Office
3,030,515
Patented Apr. 17, 1962

3,030,515

ELECTRONIC BISTABLE DEVICE

Jacques Marie Noel Hanlet, Santa Monica, Calif., assignor to Societe d'Electronique et d'Automatisme, Courbevoie, Seine, France, a corporation of France
Filed Jan. 2, 1959, Ser. No. 784,526
Claims priority, application France Jan. 4, 1958
12 Claims. (Cl. 250—213)

The object of the present invention is a device related to the electronics of solid elements which in itself and independently from the applications thereof constitutes a bi-stable electronic circuit element which can therefore be substituted for any circuit commonly used in engineering and which is utilized as a flip flop and/or elementary memory for binary information.

This device is essentially characterized by the combination of at least one electroluminescent cell and one photoconductor cell having a photo-magneto-electric effect (as defined below). These cells are optically associated so that after the first cell has been activated the light thereof strikes the second cell. These cells are also electrically combined so that the current generated in the second cell is returned to the first cell so as to form a maintaining signal on the first signal. The circuit which feeds the signat of the photoconductor cell back to the electroluminescent cell may comprise an amplifier, or the photoconductor cell can be mounted and arranged so as to operate as a photo-transistor to produce the said maintaining signal.

The invention is illustrated in the accompanying drawing in which.

Figure 1:
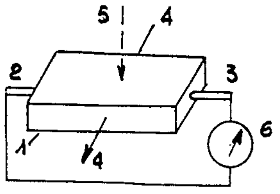
FIGURES 1 to 3 are elementary diagrams for explaining the principle of operation of the invention.

A photo-magneto-electric effect in a photo-conductive element can be defined as follows, and sufficiently clearly for the purpose of the description, reference being made to the attached diagram of FIGURE 1: If a photo-conductor element 1 provided with two opposite terminals 2 and 3 is placed in a magnetic field 4 whose direction is perpendicular to that defined in the solid 1 by the two terminals 2 and 3 and if light rays 5 whose direction of incidence is at right angles to the two other directions strikes the surface of the photo-conductor, an electric potential difference is produced between the terminals 2 and 3. If no magnetic field is present, only one photo-resistance current exists, assuming that a suitable bias (polarisation voltage) is applied between the said terminals 2 and 3; otherwise no electromotive force is generated between these terminals. However, assuming that only light is applied to the photo-conductor, pairs of charge carriers of opposite signs (electrons and holes) are created which are diffused from the illuminated face into the material and are recombined on the other face of the said material. If now a magnetic field is provided, the paths of these pairs of charged carriers are deflected in accordance with the Hall angle of this material, so that between the terminals 2 and 3 a photo-magneto-electric current is generated and creates between these terminals a potential difference whose direction is determined by the direction of the magnetic field applied. In the case of the magnetic field direction indicated at 4 in FIGURE 1, the terminal 2 constitutes the positive pole for this potential difference and the terminal 3 the negative pole. If the magnetic field is reversed, this condition also reverses itself. A load circuit which is indicated at 6 in the simplest form, i.e. a measuring device, can be connected between the terminals 2 and 3. It must of course be understood that if the internal impedance of this device is high, the device measures the said potential difference. If, on the contrary, this impedance is low, the device measures the current which generates the said potential difference. If a result or output in the form of direct current is desired, the field 4 may be given a predetermined direction and constant value and may be generated, for example, by permanent magnets 7 and 8, FIGURE 2, or by causing a direct current to flow from the current source 11, FIGURE 3, and through two coils or windings 9 and 10 arranged on both sides of the body 1 of the photo-conductor. If it is desired to obtain a result or output in the form of an alternating current, an alternating source can be utilized at 11 in FIGURE 3 and the current thereof supplied to the coils 9 and 10.

Such an effect is provided by well known photo-conductor materials such as, for example, germanium and silicon.

In order to provide a device according to the invention for the purpose of utilizing such an effect, a photo-magneto-electric element of this type is associated with an electroluminescent cell in such a manner that as soon as the said cell has been activated, the activating light strikes the photo-conductor thereby establishing a feedback circuit from the photo-conductor element to the said cell so that the excitation of the photo-magneto-electric element resulting from the cell illumination maintains the electroluminescence activation in the cell until a deactivating signal (signal for return to rest) is applied to the said combination of elements.

Figure 4:
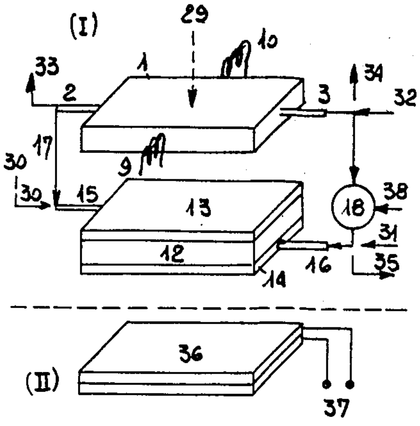
FIGURE 4 is a diagram showing an arrangement according to the invention wherein an electro-luminescent cell is connected with a photo-conductor cell having a photo-magneto-electric effect.

This combination is represented at I in the diagram of FIG. 4. The function of the element II will be explained below. This element does not participate in the operation of the device and its presence is not absolutely necessary. The electroluminescent cell is conventionally comprised of a plate or layer of electroluminescent material containing at least one activatable oxide and one activating oxide, such for example as those already known, and a monocrystalline complex of zinc and copper oxides with more than 99% by weight of zinc oxide in the complex. This plate or layer is indicated at 12 and is placed between two film electrodes 13 and 14 at least one of which, 13, is transparent to the luminous radiation emitted by the material of the plate 12 when this plate is activated. The photo-conductor 1 is sensitive to this light and preferably consists of a mono-crystalline plate. The electrode 13 is provided with a terminal 15 and the electrode 14 with a terminal 16. An electric connection is established between the terminals 2 of the element 1 and 15 of the electroluminescent cell. This connection, for example, is a direct connection 17. Another connection is established between the terminal 3 of the photo-conductor 1 and terminal 16 of the electroluminescent cell. This coupling includes a device 18 arranged so as to operate as a current or voltage amplifier between the terminals 3 and 16.

Mechanically speaking, the photo-conductor and the electroluminescent elements can of course be constructed independently or preferably they can be arranged in adjacent positions and have common surfaces. This eliminates the necessity of providing an intermediate optical system between them.

Various processes for the construction of composite elements are already known in the art.

Figure 2:
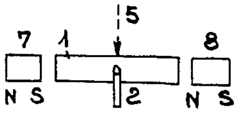
Figure 3:
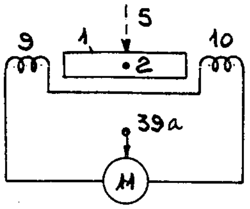

When the electroluminescent cell is activated and the potential difference is created between the terminals 2 and 3, that is, an alternating potential difference, since the source 11 in FIGS. 2–3 is alternating and therefore the magnetic field thus generated in the coils 9 and 10 is also alternating.

This voltage provides a current which originates at the terminal 3 and is amplified at 18. The amplified current is therefore applied to the terminal 16 of the electrode 14 of the electroluminescent cell. An alternating potential difference which maintains the illumination of the cell therefore exists between the electrodes 13 and 14 of the said cell.

If on the contrary the electroluminescent cell is not activated, no potential difference is present between the terminals 2 and 3 and therefore there is no potential difference between 13 and 14.

The device is bi-stable since if placed in one condition it remains in this condition as long as no external action modifies the conditions of the circuit parameters thereof to change it to the other condition.

In order to cause the device to pass from the condition of rest in which the electroluminescent cell is not activated to the operational condition in which the cell is activated, a signal must be applied. Naturally this signal may assume different forms. It may, for example, consist of a luminous excitation emitted at 29, FIGURE 4, onto the element 1 on the face opposite that which will then receive the light from the electroluminescent cell.

It may also consist in the application of a voltage at the point 30 capable of activating the said cell. It may also consist of a voltage applied at the point 32 but lower than the preceding voltage, applied to the input of the amplifier 18 and in combination with the signal which will then be received by this amplifier from the photo-conductor 1 through the terminal 3 thereof.

Obviously the output signal of the device can be tapped either between the terminals 2 and 3 as indicated by the two arrows 33 and 34 (note that the points 2 and 15 are electrically identical). It may also be tapped between the points 15 and 16 as shown by arrows 33 and 35. And it is noted that 16 is electrically unified with the output of the amplifier 18. This output signal can also be tapped at the terminals of the amplifier 18. Between each of these pairs of points the potential difference has two distinct values according to whether the device is activated or not activated.

But an output signal can also be obtained, if necessary, by utilizing a separate reading element, that is, the element indicated at II in the diagram of FIGURE 4. In this figure and in order to simplify the drawing the different possibilities of operation of the device have been combined regardless of whether these possibilities are operated separately or not, or in any suitable combination. The element II is a common photocell 36 (photoresistance cell or photovoltaic cell) whose voltage at the terminals 37 of course changes from a low to a high value, and vice versa, in accordance with the condition of the device 1, since this cell receives light from the electroluminescent cell of the device I.

In order to return the bi-stable device 1 to the inactive condition various methods of operation can also be utilized. For example, an inhibiting or blocking signal can be applied to the amplifier 18, as indicated by the arrow 38. Also, for example, the magnetic field can be cut out if this field is provided by a current as a result of the blocking or interruption of the source 11, FIGURE 3, this control being represented by arrow **39*a*** in this diagram.

A deactivating signal of a phase reversed with respect to that fed back to the terminal for maintaining the device in the operating condition, can also be applied to one of the inputs such as 30, 31 or 32 which were utilized in the activation.

The specific manner of production of the activating and the de-activating signals is not a part of the invention.

Figure 5:
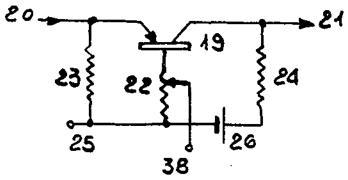
FIGURE 5 shows one example of amplifier 18 embodied in FIGURE 4.

FIGURE 5 shows one specific example of amplifier 18 but not by way of limitation. In this arrangement the amplifier 18 consists of a transistor stage, wired according to any suitable arrangement, and, for example, according to the conventional diagram shown in FIGURE 5. In this example the transistor 19 is connected at 20 to the emitter. The output thereof is tapped at 21 to the collector biased by a battery 26 through a resistor 24. The transistor base is biased by the same battery through a resistor 22, and the input is biased through a resistor 23. 38 indicates the connection for blocking the operation of this transistor stage.

During assembly the terminal 3 is connected to the terminal 20 and the terminal 16 to the point 21. Then of course the input at 30 cannot be utilized to act on the device, see FIGURE 4, since with this amplifier stage system in which the terminal 2 and therefore the terminal 15 are connected to the point 25 and are therefore grounded.

The amplifier 18 could of course be a vacuum tube amplifier if desired.

Figure 6:
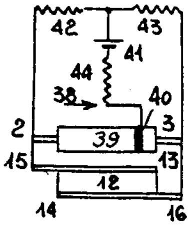
FIGURE 6 shows a modification of the arrangement illustrated in FIGURE 4.

However, it is preferably advisable to include the amplifier 18 in the structure of the device by providing an element 1 which forms both a photo-transistor and a photo-magneto-electric element. In this case, FIGURE 6, a P-N-P junction is provided in the element 1, for example, by making 39 of doped germanium and providing a junction 40 (for example, by arsenic diffusion in this area) near one of the side surfaces, for example, that of the electrode 3 by any sutiable means. If the material 39 is silicon, this junction can be formed by diffusion in the area 40 of phosphorus or antimony. This is not intended to constitute a limitation. The area 40 is then provided with an N type conduction with respect to the material 39 which has a P type conduction. The junction 40 is connected to the battery 41 through a resistor 44 to which the blocking signal can be applied at 38. Resistors 42 connected to 2 and resistor 43 connected to 3 complete the diagram as indicated.

The case of an alternating magnetic field has been considered also. If the field 5 is established as a permanent field, an alternating source can be introduced in the amplifier 18 or between the terminals 15 and 16 insofar as an electroluminescent cell of the type described and excitable by alternating current is being operated. The alternating voltage applied must of course be insufficient to produce illumination of the electroluminescent cell. In both cases the direct voltage tapped from the photo-magneto-electric element forms a pedestal for the alternating signal in order to maintain the operation of the device. In this case the interruption of the auxiliary alternating supply can be sufficient to return the device to the inactive condition.

I claim:

1. A bi-stable electronic device comprising a photo-electric cell formed of a plate of photo-conductive material having side electrodes carried on opposite edges thereof, means for establishing a magnetic field through said plate parallel with the broad faces thereof and parallel with said electrodes, whereby a photo-magneto-electric effect is produced in said cell, an electro-luminescent cell positioned to influence said photo-electric cell, said electro-luminescent cell having translucent electrode films formed on opposite faces thereof, and connections for applying to the electrodes of said electro-luminescent cell potential differences developed across the side electrodes of said photo-electric cell.

2. A device according to claim 1 and including a current amplifier introduced in one of the connections between the electro-luminescent cell and said photo-electric cell.

3. A device according to claim 2 wherein said amplifier comprises a transistor amplification stage.

4. A device according to claim 2 wherein said amplifier is integral with the said photo-luminescent cell and comprises a photo-transistor junction formed in said photo-luminescent material near the side electrode to which the said interconnection is connected.

5. A device according to claim 1 wherein the magnetic field is an alternating field.

6. A device according to claim 2 wherein the magnetic field is an alternating field.

7. A device according to claim 2 wherein the magnetic field is a permanent field, and including means for introducing an alternating oscillation in the said interconnecting amplifier.

8. A device according to claim 1 wherein the activating signal for activating the device comprises means producing a luminous excitation of said photo-conductive material.

9. A device according to claim 1 wherein the excitation signal comprises means for applying an electric signal between a pair of electrodes of the device.

10. A device according to claim 1 and including means for applying a de-activating signal to a pair of electrodes of said device.

11. A device according to claim 1 and including a pair of output terminals connected between electrodes of the device.

12. A device according to claim 1 and including a photo-resistance element mounted to be influenced by the luminous excitation thereof and producing an output signal in accordance with such excitation.

References Cited in the file of this patent

UNITED STATES PATENTS

| | | |
|---|---|---|
| 2,904,697 | Halsted | Sept. 15, 1959 |
| 2,942,117 | Maxwell et al. | June 21, 1960 |

OTHER REFERENCES

Photo Conductive and Photoelectromagnetic Effects in InSb, Kurnick et al., Journal of Applied Physics, volume 27, No. 3, March 1956.